United States Patent Office 3,809,661
Patented May 7, 1974

3,809,661
MOLDING COMPOSITIONS AND METHOD
OF MOLDING
Wallace H. Shapero, El Toro, and Albert Cane, Inglewood, Calif., assignors to Mattel, Inc., Hawthorne, Calif.
No Drawing. Original application July 20, 1971, Ser. No. 164,436, now abandoned. Divided and this application Feb. 21, 1973, Ser. No. 334,426
Int. Cl. C08d 7/16; C08f 45/24
U.S. Cl. 260—5
8 Claims

ABSTRACT OF THE DISCLOSURE

A two part molding composition and method of forming molded rubber and plastic products therefrom which comprises a latex phase to which is added a gellant phase containing glucono-delta-lactone which serves as a means for providing a delayed gelation of the rubber or plastic material in the latex. In the preferred composition, a material is incorporated in the gellant phase which will imbibe the water present in the latex during gelation and at least a portion of the glucono-delta-lactone is disposed within microcapsules permeable to the latex composition whereby a dry molded product can be readily formed utilizing the aforegoing composition.

---

This is a division of application Ser. No. 164,436, filed July 20, 1971, now abandoned.

Most known synthetic polymers can be prepared in a latex form. The latex is a milk-like fluid in which small globules or particles of the rubber or plastic are suspended in water. The synthetic latices are prepared by emulsion polymerization techniques whereby a surfactant is used to stabilize the minute monomer globules during the course of polymerization through the use of a free radical or other type of initiator. Upon completion of the polymerization process to form a synthetic latex, an additional surfactant is normally added to further stabilize the formed emulsion. Many of the emulsion polymerizations are carried out under alkaline conditions having a pH range of 8 to 11, utilizing mostly anionic surfactants.

Natural rubber is an aqueous dispersion of poly cis-isoprene and is stabilized by a complex surfactant system which occurs naturally. Normally, upon removal from a tree, however, a preservative, such as ammonia, must be added to counteract acid forming putrefaction processes and the effects of multivalent metals which would tend to coagulate or gel the latex. Natural and synthetic rubber latex are conventionally coagulated by the use of acidic substances. Where a delayed action acidification is required, silicofluoride ion is used. This substance, which hydrolyzes to HF, is toxic and is, thus, not suitable for the utilization by children or even adults who are interested in molding rubber parts in the home, as a hobby, or the like.

To date, latices have been formed generally as relatively thin sheets or the like but have not been utilized to form solid bodies having fine features or the like. There are various reasons why latices have not been generally so used. Firstly, it is pointed out that most coagulating agents used cause coagulation immediately upon contact with the latex. If a solid body were being formed it is not possible to obtain a continuous rubber phase throughout when there is such rapid coagulation. Rather, a plurality of globules result and no defined molded shape is obtainable. Thus, it is important that the coagulating agent have a slow release or slow effect which in turn allows it to be adequately dispersed throughout the latex prior to its taking effect and then allowing coagulation to occur equally throughout the entire latex. As indicated above, a delayed acting material, namely the silicofluoride ion which had been previously used is not suitable for non-commercial applications in the home or the like.

Another problem in attempting to form molded bodies of latex relates to water removal and shrinkage of the formed product. A latex formed product normally is wet and sticky. With time, the water will evaporate and the formed product would shrink up to 30 percent whereupon it will eventually become firm. This could take from several days up to weeks. In any event, it should be apparent that the formed product would normally contain a substantial amount of water and could be readily deformed and thus is not usable for a significant period of time. Further, of course, such a product that will shrink upon standing will lose the desired relative dimensional characteristics. Thus, for the aforegoing reasons there has been virtually no effort to utilize latex compositions to form molded bodies having relatively thick cross sections.

Briefly, the herein invention is comprised of a composition which has two parts—the first part is referred to as the latex phase and contains a synthetic and/or natural rubber latex. A single latex can be utilized or a mixture of latices, such as a natural rubber latex and a styrene-butadiene one can be combined to provide desired properties. Where such a mixture is utilized, it is additionally preferred to incorporate an anti-thickening agent into the latex phase. Further, other materials such as defoamers and the like, can be present in the latex part.

The second part of the composition is referred to as the gellant phase and contains glucono-delta-lactone in an amount sufficient, when added to the latex phase, to cause a delayed gelation of the latex. Preferably, the glucono-delta-lactone is encapsulated in microcapsules having walls which are permeable to the latex solution which serves to further delay the effect of the lactone in causing gelation. Additionally, it is preferred that the gellant phase also contain a material which will imbibe the water present in the latex sufficiently so that a dry product is obtained. A typical example of such a material is chitosan which has a high water absorbency under acidic conditions as during gelation. Preferably, the water absorber should begin to take effect immediately upon the gellation occurring.

It is believed that the invention will be better understood from the following detailed description and examples. The herein invention is in effect a two-part system; the first part comprising a latex and the second part containing a coagulant for the latex and preferably additional material which will serve to absorb water in the latex when coagulation begins. Thus, the first part of the composition of the invention can utilize virtually any latex. Particularly, the invention can include any natural latex and synthetic resin latices which have been stabilized with anionic surfactants. This includes the majority of commercially available latices and various latex blends. Available natural latex materials generally have some of the water removed and thus have increased solid contents prior to commercial utilization. Further, the natural rubber latices generally contain a preservative such as ammonia. Typical solid contents of the natural latices will vary from 50 to 70 weight percent. The natural rubber latex can be used alone in the herein invention or it can be combined with the synthetic latex. Alternatively, of course, a blend of synthetic latices or a single synthetic latex can be used. One of the most common forms of synthetic latices are known as SBR latices which are emulsion polymerizations of styrene and butadiene monomers. Various ratios of these monomers are used to achieve a wide range of physical properties for the latex material. Generally, the solids content of the SBR latices will range from 35 to 75 weight percent. In addition to the SBR type of latex, other commercial widely used latices include homopolymers or copolymers of the following monomers: acrylonitrile, vinylchloride, isobutylene, vinylidene chloride, vinyl toluene, chloroprene, acrylic and methacrylic derivatives, vinylpyridine. As indicated, the commercial latices which are useful in the herein invention are stabilized with an anionic surfactant such as potassium oleate. The requirement for the anionic surfactant relates to the use of the particular coagulant of this invention, namely, the glucono-delta-lactone as will be further explained. The emulsion polymerizations generally are carried out under alkaline conditions where the pH varies from 8 to 11 as indicated above. When this pH is reduced to a critical range of between 5 and 7, most of the anionically stabilized latices are gelled and/or coagulated. If a product is molded of a natural rubber latex, it can be subsequently cold worked. For example, in attempting to remove the product from the mold in which it is formed, a child or other person making the part could easily deform it when it is made from natural rubber. As a result, it is particularly desirable to incorporate an SBR latex into a natural rubber latex mixture to provide a resilient non-deformable gel that can be easily removed without cold working. Thus, it is preferred to utilize, for example, a weight mixture of ⅔ natural rubber latex and ⅓ an SBR latex. SBR alone may also be used, but adding natural rubber enhances the physical properties. As little as one weight percent SBR may improve the gel characteristics of natural rubber and reduced deformability. Up to 99 percent SBR can be used, but the properties of natural rubber are sacrificed above 50 weight percent SBR.

When the latex part of the composition of this invention contains both a natural rubber and an SBR latex it will preferably additionally contain a small amount of water soluble rosin soap or soaps which prevent a thickening of the mixture of the SBR and latex. A particularly preferred example of the rosin soap is Dresinate 731 made by Hercules Powder Company, Inc. This material is a water soluble soap of processed rosins and tall oils that is, in effect, a surfactant. Thus, a mixture of the natural rubber and SBR latices can contain from .10 to 2 parts of the rosin soap based on 100 parts of the latex phase. Additionally, fatty acid soaps can be used. Adding $NH_3$ or another source of alkalinity, as well as dilution with water, also reduces viscosity. Non-ionic surfactants may also be used but are not preferred.

The latex part or phase of the composition can additionally contain, if desired, an anti-foaming agent which is commercially available and is well known to be utilized for these types of materials. The anti-foam agent is used to prevent frothing and foaming which results in defective parts. A typical anti-foam agent is Deefo 233 made by Ultra Adhesives, Inc. Generally, the latex phase can contain from .01 to 2 parts of the anti-foam agent per 100 parts of latex.

The second phase which is referred to as the gellant phase of the composition of this invention contains glucono-D-lactone. The glucono-D-lactone, hereinafter referred to as GDL, serves the important function of gelling the rubber in the latex and form the desired solid product. The GDL is a non-acidic material which reacts with the water to yield gluconic acid which is a fairly strong acid wherein the pH of a 1 percent solution is 3.2. Added to the latex composition or latex phase, GDL provides for a slow release of the acid and converts the latex composition from alkaline pH to an acid pH to effectively destroy the surfactant present so that a phase reversal will occur resulting in gelation of the rubber. The particular advantage of GDL is that it provides a relatively slow release of acid which takes up to, for example, 15 to 30 seconds to occur after addition of the GDL to the latex phase. Further, and of significant importance is the fact that the GDL is a safe, non-toxic material.

It is necessary for the GDL to be present in an amount sufficient to release gluconic acid to reduce the pH of the latex used below a critical range of 5 to 7. The amount of the GDL for a given latex composition can be determined by simple trial and error which is mostly dependent upon the critical pH point of phase reversal for the given latex composition. The amount of the GDL will depend upon the initial pH of the latex composition. The more alkaline the composition, the more GDL most likely required to reduce the pH below the critical gelation point. Typically, for 100 parts of latex, the amount of GDL can range from 4 parts to 25 parts by weight. It is found that it is preferred to utilize from 6 to 15 parts of GDL per 100 parts of latex.

The time required for the GDL to gel a given quantity of a specific latex depends upon the weight ratio of GDL to the latex, the buffering capacity of the latex, the temperature of the system, and the GDL particle size, and the rate and amount of stirring or agitation. As indicated above, the time delay for the GDL normally is in the range of 15 to 30 seconds before gelation occurs, in other words, before sufficient gluconic acid has been released to lower the pH below the critical gelation point. As a further means for lengthening the time required to gel, the GDL may be micro encapsulated in accord with procedures described in U.S. Pats. 3,415,758, 3,155,590 and 3,341,416. The preferred capsule wall is water permeable rather than water soluble. Water permeable cell walls thus allow the latex solution to contact and reach the GDL with the permeability affecting the rate at which the gluconic acid is released into the latex material. A typical cell wall is ethyl cellulose. Other cell wall materials can include polyvinyl alcohol and cellulose acetate.

The size of the microcapsules is not critical and they can readily vary from 25 to 250 microns in diameter. The wall thickness, however, of the capsule will dictate the delaying action of the GDL. In other words, the permeability or the rate of transfer of the latex through the cell walls will be affected by their thickness. The cell wall thickness is referred to in terms of the amount of cell wall present rather than actual thicknesses per se. A typical microcapsule of this invention will contain 93 weight percent GDL and 7 weight percent of capsule wall. This type of a microcapsule will typically give a delay of 2 to 3 minutes when utilized in a latex composition. If one desires more delay, one would obviously increase the capsule wall percentage.

In addition to the utilization of microcapsules and controlling wall thickness thereof, additive materials can be used which tend to suppress the rate of release of acid from the GDL. This can be accomplished by taking advantage of a common ion effect through the use of a material such as sodium gluconate. Thus, if sodium gluconate is incorporated into the gellant phase due to the common gluconate ion with the GDL, a suppression of the formation of the gluconic acid may be achieved. Thus, from 4 to 40 parts of sodium gluconate can be utilized per 100 parts of latex.

Another additive that can be utilized is a material that tends to bring down the initial pH of the latex composition, in other words a material that serves to neutralize some of the basicity of the latex without causing gelation. An additive such as this can be utilized to reduce the amount of GDL required. A typical such material is glycine which ranges from 5 to 50 parts per 100 parts of latex. Another material similar to glycine is imino diacetic acid.

In addition to the GDL, is is preferred to incorporate a water scavenger in the gellant phase. The water scavenger is a material that will absorb water from the latex as soon as gelation begins, due to the effect of the GDL. The water scavenger is preferably powder material which has a high water absorbency. Normally, there is about 30 weight percent water present in the latex composition which should be absorbed by the scavenger material. Thus, the use of the scavenger would provide a dry resulting product which is non-sticky and can be readily removed from the mold and easily handled. Further, it provides for a resulting end product that has a final desired shape. Normally one of the most severe limitations to utilization of latex molding in the past, has been the shrinkage due to the release of water from a molded latex part. By the present technique, most of the water is absorbed and held within the water scavenger releasable by evaporation or the like from the final molded product at a very slow rate. Thus, the resulting product has minimal shrinkage after being formed. The water scavenger remains within the formed product having absorbed the water therein. This water scavenger can comprise from 5 to 75 weight percent of the gellant composition.

A wide variety of materials can be utilized as water scavengers. These include tapioca starch, chitosan, a material known as colloid "M" made by Stein, Hall and Company, Inc. which is a modified guar gum and even wood flour. One can thus choose a water scavenger that will absorb the greatest amount of water without deleteriously affecting the other properties of the formed compound. The scavenger should begin to pick up and withdraw the water as soon as it is released from the latex as it becomes acid. Thus, this is another preferred requirement for the scavenger. As a result, a scavenger which is very slow to pick up water would not be as preferred because water would exude from the rubber part. Ethyl cellulose is an example of such a slow scavenger as well as contain modified starches. Specifically, colloid "M" and chitosan tend not to absorb water in alkaline conditions and do absorb substantial amounts of water in acid conditions.

In addition to the aforegoing described composition, various other substances can be incorporated. Sometimes it is necessary to stabilize the latex phase. Anionic systems can be stabilized by the addition of surfactants such as sodium or potassium oleate, ricinoleate or rosinate. These are generalized as carboxylates. Additionally, organo sulfates and/or sulfonates can be utilized to stabilize the latex. The amount of these stabilizing surfactants utilized will, of course, be solely dependent upon the requirements of the latex system and can vary widely. The amounts will be determined by trial and error if required. Additionally, the pH of the latex can be raised by the use of ammonium, sodium or potassium hydroxide which often serve to render latex more stable. The amount of the hydroxide used can range from 0.5 to 5 parts per hundred parts of latex.

Fillers can be incorporated into the composition of this invention. The fillers may be mixed into either phase. These fillers can include clay, silica, calcium carbonate, mica, and many other natural materials which serve to reduce costs and/or modify physical properties of the resulting material. The fillers can be present in amounts ranging from 0 to 100 parts per 100 parts of the latex phase, from 0 to 75 weight percent of the gellant composition.

Viscosity modifiers can be utilized in the latex phase, in amounts ranging from 0 to 5 parts per 100 parts of latex. These include cellulose derivatives, natural hydrocolloids, gum arabic, locust bean gum, carrageenan, casein, glue gelatin and the like. In addition, synthetic materials such as polyvinyl alcohol, polyvinyl ethers, and acrylic polymer derivatives can be used for the viscosity control.

Latex compounding ingredients including vulcanizing agents such as sulfur, thiuram, and xanthogen polysulfides can be used when it is desired to improve the physical properties in amounts ranging from 0.1 to 5 parts per hundred parts of latex. These vulcanizing agents are normally present in the latex phase.

From 0.1 to 2 parts per 100 parts of latex of accelerators can be utilized to accomplish the acceleration of the vulcanization process. Zinc dithiocarbamate is a widely used example. Also included, for example, dithiocarbamates, xanthates, thiazoles, and thiurams. Further, antiooxidants such as amine derivatives and phenolic derivatives can be incorporated into the compositions of this invention in 0.1 to 1.5 parts per 100 parts of latex.

In order to reduce the expense of the herein system, one can provide a portion of the GDL in an unencapsulated form. For example, from 20 to 50 weight percent of the GDL required can be in its normally powder form mixed with the remaining encapsulated GDL. This mixture of encapsulated and unencapsulated GDL will then be added to the latex when it is desired to achieve gelation. As a further feature of the herein invention, it is possible to formulate the microcapsule walls to encapsulate therein the water scavenger material. Since the microcapsule walls herein are water permeable, the microcapsules are not formed in an aqueous medium. This, thus, permits the encapsulation of the water scavenger material into the walls during the formulation thereof. It is believed that the invention will be further understood from the following detailed examples.

EXAMPLE 1

A two part composition of this invention was formulated. The latex phase contained 100 grams of a natural rubber latex, denoted as FR S-5 made by the Firestone Tire and Rubber Company. This latex contained 69 percent total solids. The second part of gelant phase of the composition contained 7.5 grams of glucono-D-lactone and 7.5 grams of sodium gluconate. To demonstrate the molding capabilities, the two parts were mixed intimately and poured into a mold. The latex underwent a phase reversal and began gelling within 40 seconds and completed the gel process within 180 seconds. The resulting molded product was somewhat wet, and a firm, but rubbery solid part.

EXAMPLE 2

In this example, a latex phase is formulated containing 20 grams of natural rubber latex. The same natural rubber latex used in Example 1. To this was added an equal amount of 20 grams of styrene butadiene rubber latex denoted as FR S-230 made by the Firestone Tire and Rubber Company. Additionally, the latex phase contained .8 gram of 50 weight percent Dresinate 731 in water. Finally, .25 gram of anti-foam denoted as Deefo 233. The gellant phase contained 3.2 grams of glucono-D-lactone encapsulated in ethyl cellulose microcapsules and .80 gram of colloid "M." When the two phases were combined and intimately mixed, a gelation began in approximately 2.5 minutes and was completed in 4.5 minutes. The resulting product was firm and dry. The composition set forth in this example incorporated a preferred ingredient, namely, means for strengthening the natural latex so that it could not be readily cold worked after being molded through the use of the SBR latex, and the encapsulation of the GDL to retard the rate of gelation. Further, as can be seen, this invention utilized a water scavenger through the use of a colloid "M" and provided a dry product. The product was allowed to stand for 30 days and with no noticeable shrinkage.

EXAMPLE 3

The latex phase was comprised solely of 10 grams of styrene butadiene latex denoted as FR S-230 which is the same material used in Example 2. The gelant comprised 1.5 grams of a mixture of glycine and GDL in a two to one ratio of the glycine to the GDL by weight. When the two phases were mixed, the latex began to gel in 20 seconds, and completed gelation in 60 seconds. The resulting product was a firm rubbery part.

What is claimed is:
1. A two part molding composition comprising:
 (a) a first part comprising at least one latex phase stabilized with an anionic surfactant, and
 (b) a second part comprising a gelant phase com- prising glucono-D-lactone, at least a portion of which is micro-encapsulated, in an amount sufficient to cause a phase reversal and gelation of the latex when added thereto, and a material which will imbibe water released from said latex phase upon gelation thereof, said material being present in an amount sufficient to provide a resulting dry gelled product when said two parts are added together.

2. The composition of claim 1 wherein the amount of material to imbibe water comprises 4 to 75 weight percent of the gelant phase.

3. The composition of claim 1 wherein the amount of glucono-D-lactone in the gelant phase is from 4 to 25 parts per 100 parts of said latex.

4. The composition of claim 3 wherein the amount of glucono-D-lactone is from 6 to 15 parts per 100 parts of said latex.

5. The composition of claim 1 wherein the latex phase comprises a mixture of a natural rubber latex and a styrene-butadiene latex.

6. The composition of claim 1 wherein said material which will imbibe water is selected from the group consisting of chitosan, starch, guar gum, and wood flour.

7. The composition of claim 1 wherein at least 50 weight percent of the glucono-D-lactone is microencapsulated.

8. The composition of claim 1 wherein the microencapsulated glucono-D-lactone has cell walls of a water permeable material.

References Cited

UNITED STATES PATENTS

| | | | |
|---|---|---|---|
| 3,551,370 | 12/1970 | Dalton | 260—29.6 PT |
| 3,558,541 | 1/1971 | Dalton | 260—29.6 PT |
| 3,668,167 | 6/1972 | Ragazzini et al. | 260—29.6 ME |
| 2,203,773 | 6/1940 | Cordier | 260—71 |

OTHER REFERENCES

Chem. Abstract, vol. 55, 5797e.
Chem. Abstract, vol. 64, 16533c.

JOHN C. BLEUTGE, Primary Examiner

U.S. Cl. X.R.

260—17.4 ST, 29.7 PT, 29.7 E, 41.5 R, 41.5 A, 742, 815, 821